United States Patent [19]
Michaut et al.

[11] Patent Number: 5,544,209
[45] Date of Patent: Aug. 6, 1996

[54] PROCESS FOR REPAIRING AND PROTECTING FROM CRACKING THE INNER WALL OF A TUBE FOR PENETRATING THE BOTTOM HEAD OF A PRESSURIZED-WATER NUCLEAR REACTOR VESSEL

[75] Inventors: Bernard Michaut, Lyons; Bernard Pellegrin, Saint Laurent de Mure; Sylvie Voisembert, Heyrieux, all of France

[73] Assignee: Framatome, Courbevoie, France

[21] Appl. No.: 235,330

[22] Filed: Apr. 29, 1994

[30] Foreign Application Priority Data

Apr. 29, 1993 [FR] France ................................. 93 05097

[51] Int. Cl.⁶ ................................................. G21C 19/00
[52] U.S. Cl. ............................ 376/260; 376/254; 205/115; 205/131
[58] Field of Search ..................................... 376/249, 254, 376/260, 277, 287, 288, 305, 307, 463; 205/115, 131, 205, 206, 271, 273; 204/224 R, 225, 272, 275, 277; 29/402.01, 402.18

[56] References Cited

U.S. PATENT DOCUMENTS

| | | | |
|---|---|---|---|
| 4,624,750 | 11/1986 | Malagola et al. | 205/131 |
| 4,696,723 | 9/1987 | Bosquet et al. | 205/115 |
| 4,826,582 | 5/1989 | Lavalerie et al. | 204/224 R |
| 5,227,124 | 7/1993 | Saito et al. | 376/260 |

FOREIGN PATENT DOCUMENTS

| | | |
|---|---|---|
| 291373 | 11/1988 | European Pat. Off. . |
| 2565323 | 12/1985 | France . |
| 2585817 | 2/1987 | France . |
| 2652191 | 3/1991 | France . |
| 2656458 | 6/1991 | France . |
| 2676140 | 11/1992 | France . |

OTHER PUBLICATIONS

Patent Abstracts of Japan, vol. 4, No. 77, JP-A-55 041 963, Abstract, Mar. 25, 1980.

*Primary Examiner*—Daniel D. Wasil
*Attorney, Agent, or Firm*—Pollock, Vande Sande & Priddy

[57] ABSTRACT

During shutdown of the nuclear reactor, the closure head of the vessel having been dismounted and the vessel (3) and the pool of the reactor both being filled with water, an inner zone of the penetration tube (6) for penetrating the bottom head of the vessel (3) is isolated between two seals (39,42), from the upper level of the pool. An electrolyte is caused to flow in the isolated zone inside the penetration tube (6) and a current is passed through the electrolyte in order to deposit a metallic electroplating layer onto the inner surface of the penetration tube (6) in the isolated zone. The metallic layer is preferably a layer of nickel of a thickness of approximately 0.1 mm.

9 Claims, 7 Drawing Sheets

PROCESS FOR REPAIRING AND PROTECTING FROM CRACKING THE INNER WALL OF A TUBE FOR PENETRATING THE BOTTOM HEAD OF A PRESSURIZED-WATER NUCLEAR REACTOR VESSEL

FIELD OF THE INVENTION

The invention relates to a process for repairing, and for protecting from cracking, the inner wall of a tube for penetrating the bottom head of the vessel of a pressurized-water nuclear reactor.

BACKGROUND OF THE INVENTION

Pressurized-water reactors include a generally cylindrical vessel which contains the reactor core and which is arranged with its axis vertical in a vessel pit emerging via its upper end into a pool.

The vessel includes a closing head at its upper portion and a convex bottom head at its lower portion, the later being penetrated by a plurality of substantially vertical tubes called vessel bottom-head penetrations.

These vessel bottom-head penetrations include an end projecting inside the reactor vessel and an opposite end which projects beneath the convex bottom head and is connected to a flexible measurement conduit enabling the bottom head of the vessel to be joined to an instrumentation room arranged in the structure of the reactor building, generally adjacent position to the vessel pit.

Each of the measurement conduits and the corresponding bottom-head penetration provides the passage for a thimble in which moves a measurement probe fixed to the end of a very long flexible element and its insertion into the vessel and the core in order to carry out measurements, for example neutron flux or temperature measurements, inside the core while the reactor is operating.

The tubes for penetrating the vessel bottom head are generally made of nickel alloy and are welded to the convex bottom head of the vessel which is generally made of high-strength steel.

The inner surface of the vessel bottom-head penetrations is in contact, during the operation of the reactor, with the primary reactor coolant constituted by pressurized water containing various additives.

A certain tendency towards cracking of the inner surface of the vessel bottom-head penetrations has been observed, in particular in the vicinity of the zone in which the penetration tube is welded to the vessel bottom head.

It may be necessary to repair the inner surface of the penetrations after the reactor has been operating for a certain time, and it is advantageous, in any case, to treat this inner surface preventively in order to prevent or to delay the cracking of the inner wall of the penetrations while the rector is operating.

In the case of tubular elements, which can be subjected to stress corrosion and to cracking in contact with the primary coolant of a reactor, for example in the case of the tubes of the steam generators of pressurized-water nuclear reactors, repair methods or procedures for preventive treatment of the inner wall of the tubular elements have been laid down which enable their lifetime to be extended and the safety of the nuclear reactor to be improved.

It has thus been anticipated, in the case of the tubes of steam generators which include a transition zone between a deformed portion and a non-deformed portion, in the vicinity of the upper face of the tube plate into which these tubes are fixed, to treat their inner wall, in the transition zone, for example by mechanical expansion, thermal stress-relieving or peening by means of small balls (shot peening).

In the case where cracks have appeared, it is also possible to carry out a repair by sleeving the tube in the transition zone.

Processes and devices have also been proposed, in applicant's FR-A-2,565,323, FR-A-2,585,817, FR-A-2,615,207 and FR-A-2,652,191, for depositing metal by electrolysis onto the internal surface of the steam-generator tubes in the transition zone. This treatment makes it possible to prevent contact between the primary reactor coolant and the transition zone which is susceptible to stress corrosion and to cracking.

The metal deposited by electrolysis is generally pure nickel, the steam-generator tubes being made of a nickel-based alloy containing a proportion of nickel of the order of 75%.

However, a process for repairing and protecting and from cracking, the inner wall of the vessel bottom-head penetrations of a nuclear reactor, after the reactor has been operating for a certain time, was not known to date.

SUMMARY OF THE INVENTION

The object of the invention is to provide a process for repairing, and for protecting from cracking, the inner wall of a tube for penetrating the bottom head of a vessel of a pressurized-water nuclear reactor, the vessel of having a generally shape and being arranged with its axis vertical in a reactor vessel pit, emerging, via its upper end, into a pool and including a head and a convex bottom head penetrated by a plurality of substantially vertical tubes each connected to a reactor instrumentation room via a measurement conduit providing the passage of a measurement probe into the reactor core which is arranged inside the vessel. The process can be implemented either for carrying out repairs or by way of prevention, and without exposing the personnel responsible for the repair work to radiation coming from the reactor vessel.

To this end, during a period of shutdown of the reactor, the head of the vessel and the lower and upper internals of the vessel having been dismounted and both the vessel and the pool being filled with water, from the upper level of the pool and under water, an inner zone of the tube, having a length and a position defined in the axial direction of the tube, is isolated, the isolated zone is filled with an electrolyte and an electrolysis current is passed through the electrolyte in order to deposit a metallic electroplating layer onto the inner surface of the tube in the isolated zone.

The invention also relates to apparatus for carrying out the process.

BRIEF DESCRIPTION OF THE DRAWINGS

An example of the implementation of the process according to the invention and the apparatus for carrying it out will now be described, by way of example, with reference to the attached figures.

DETAILED DESCRIPTION

Figure 1:
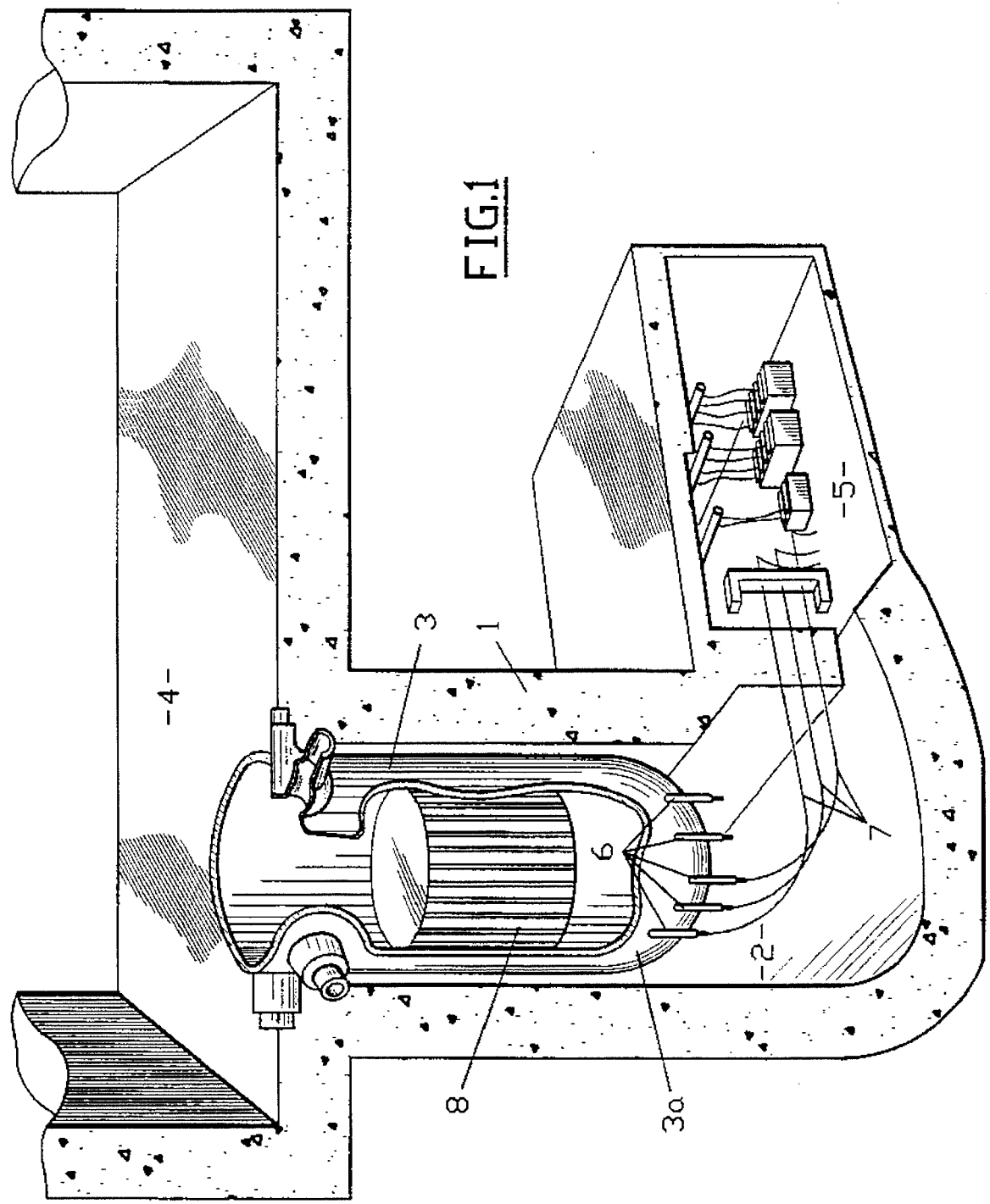
FIG. 1 is an exploded perspective view of a portion of the building of a pressurized-water nuclear reactor.

FIG. 1 shows a portion of the concrete structure 1 of a nuclear reactor, delimiting a reactor vessel pit 2 in which is arranged the nuclear reactor vessel 3, a pool 4 into which the pit 2 emerges via its upper portion, and an instrumentation room 5 in an adjacent position in relation to the reactor vessel pit 2.

The vessel 3 of generally cylindrical shape includes a convex bottom head 3a penetrated by vessel bottom-head penetrations 6 which are each connected, outside the vessel 3, beneath the bottom head 3a, to an instrumentation guide tube 7 providing a connection between the bottom head 3a of the vessel and the reactor instrumentation room 5.

From the instrumentation room 5, it is possible to insert and to move, inside each of the guide tubes 7, a measurement probe fixed to the end of a very long flexible element, so as to insert the measurement probe into the vessel 3 and into the reactor core 8 arranged inside the vessel 3, in order to carry out measurements, for example neutron flux or temperature measurements, while the reactor is operating.

The measurement signals are transmitted by the probe, which can be moved inside the core, into the instrumentation room 5 where these measurement signals are received and processed by measurement units.

Figure 2:
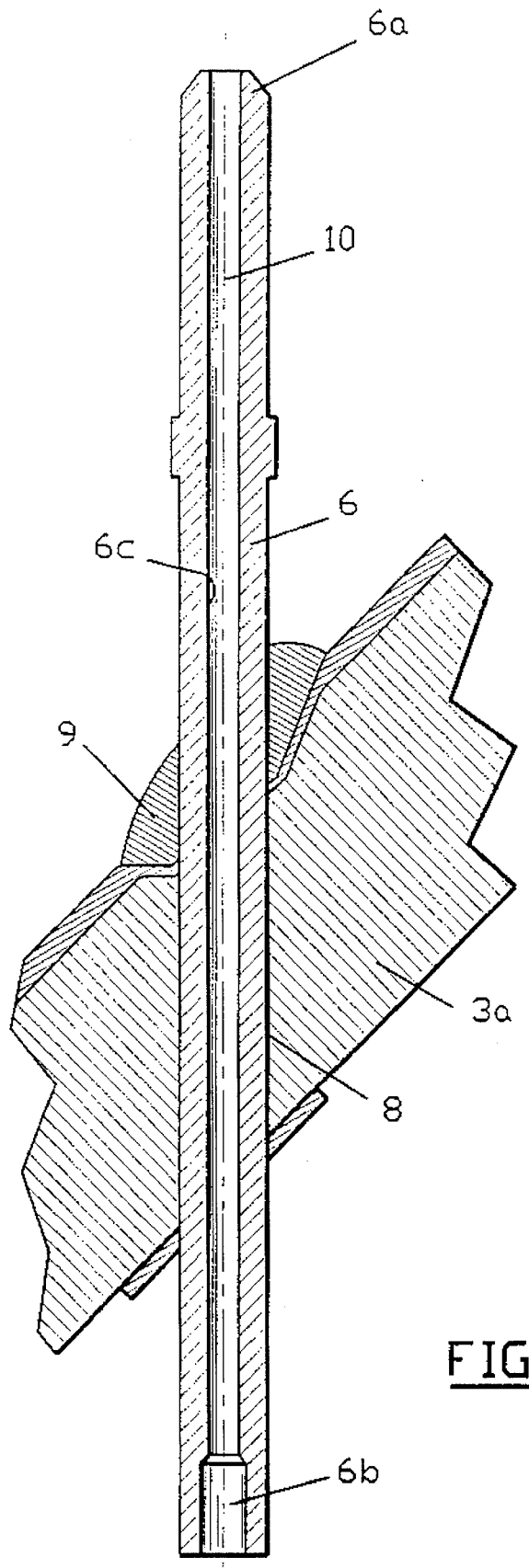
FIG. 2 is a large-scale sectional view of a vessel bottom-head penetration of the nuclear reactor shown in FIG. 1.

FIG. 2 shows a portion of the convex bottom head 3a of the nuclear reactor vessel, in the region of a vessel bottom-head penetration 6 which is constituted by a penetration tube engaged virtually without clearance in an opening penetrating the vessel bottom head and welded to the vessel bottom head, in the region of its inner face, by means of a joint 9 made of filler metal deposited in a bevel into which the opening emerges.

The penetration tube 6 includes a portion projecting inside the nuclear reactor vessel, above the vessel bottom head 3a, the end 6a of which is bevelled, in the form of a frustoconical surface.

The lower end 6b of the penetration tube 6, arranged outside the vessel, beneath the bottom head 3a, includes a bore widened diametrally in relation to the bore of the regular portion of the tube 6. This widened bore enables the guide tube 7 to be mounted inside the penetration tube 6. The guide tube 7 is welded to the lower end of the tube 6.

The axis 10 of the opening and of the tube 6 of the penetration extends vertically.

After the nuclear reactor has been operating for a certain time, the inner surface 6c of the tube 6 is liable to include cracks or incipient cracks, principally in the zone near the weld bead 9.

Such cracks or incipient cracks can be detected using an eddy-current probe which is inserted into the inner bore of the penetration 6, during a period of shutdown of the nuclear reactor, the head of the vessel having been removed and both the vessel and the pool being filled with water.

If cracks are detected in the inner wall 6c of a penetration 6, the repair can be carried out by using the process according to the invention.

It may also be advantageous to carry out the treatment according to the invention on all the penetrations 6 of the bottom head of the vessel 3, by way of prevention.

Figure 3:
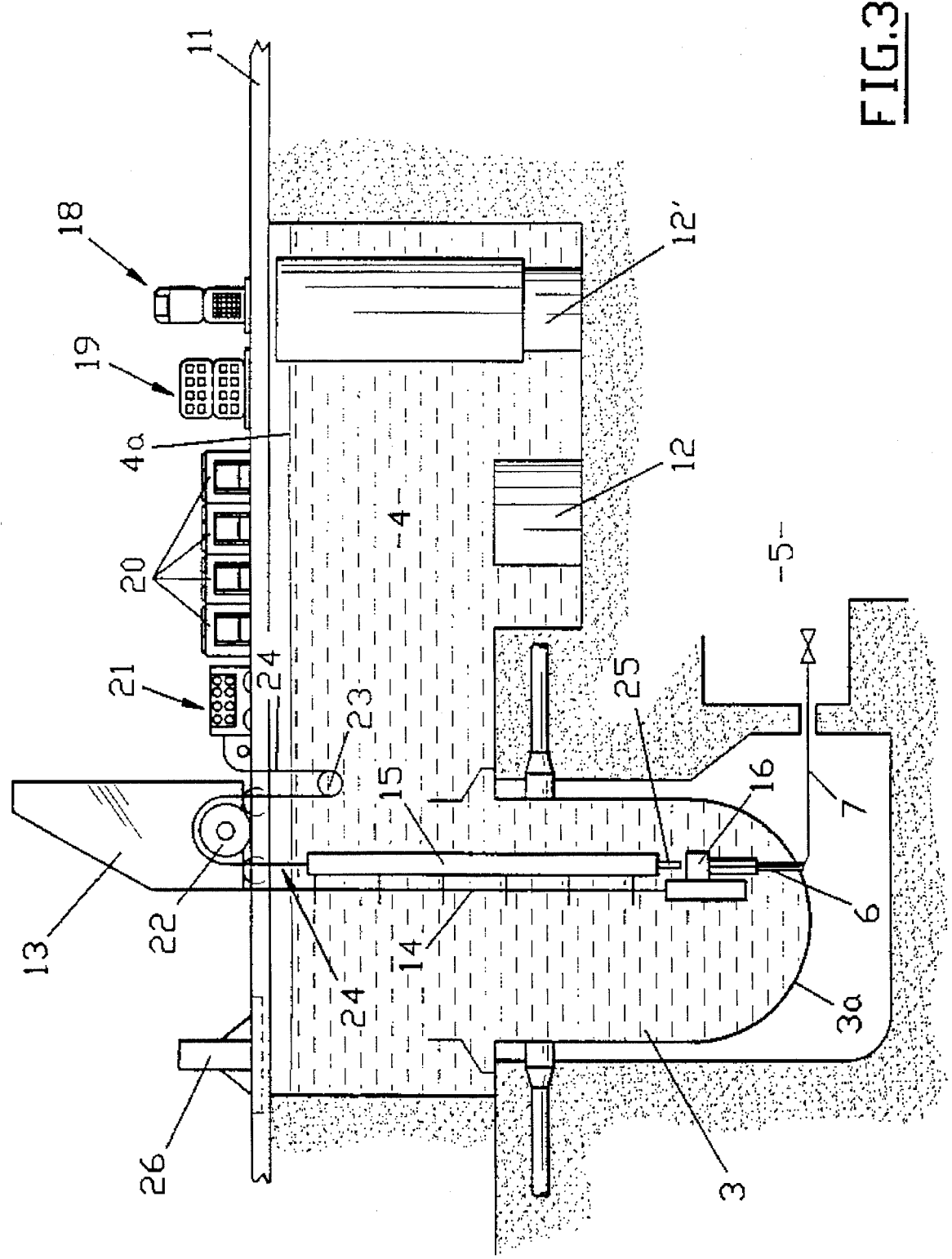
FIG. 3 is a schematic view, in elevation and in vertical section, of an installation for implementing the process according to the invention.

In all cases, it is possible to use a repair-work installation, such as shown in FIG. 3.

The repair work is carried out during a period of shutdown of the nuclear reactor, the head of the vessel 3 having been removed and, for example, placed on a reception stand on the bottom of the pool 4 which is filled with water up to a level 4a, slightly below the upper edge 11 of the pool.

After the vessel head is removed, the polar crane of the nuclear power station is used to lift, and to extract from the vessel 3, upper reactor internals arranged above the core, these upper internals being placed on a storage stand 12 in the reactor pool.

Next, the fuel assemblies of the core are unloaded and transferred into a storage pool.

Next, the lower reactor internals are dismounted and transferred, these being placed on a storage stand 12' on the bottom of the pool.

It is thus possible to gain access, from above, to the upper ends 6a of the vessel bottom-head penetrations 6.

The installation enabling the procedure according to the invention to be implemented, shown in FIG. 3, includes a stationary portion resting on a floor in the upper region 11 of the pool and a movable portion which can be fixed, for example, to the reactor loading machine 13 which moves on rails resting on the floor in the region of the upper edge 11 of the pool.

The movable portion of the installation includes, in particular, a vertical pole 14 whose upper portion is fixed to the carriage of the loading machine 13 and a vertical guide conduit 15 fixed along the pole 14.

In addition, the pole 14 carries, at its lower portion, in the axial extension of the guide conduit 15, a guide and insertion end-piece 16 which can be positioned by the pole 14, so as to rest on the upper end portion 6a of any vessel bottom-head penetration 6 penetrating the bottom head 3a of the vessel 3.

By moving the carriage of the loading machine 13 and the rod which is fixed to a handling assembly resting on such carriage, it is possible to reach a penetration 6 in any position on the bottom head 3a of the vessel 3.

The apparatus as shown may serve firstly to inspect the penetrations, by inserting an eddy-current probe inspection device into the bore of the penetration 6 via the conduit 15 and the end-piece 16.

The information given by the eddy-current probe is processed in an inspection and control station 18 forming a stationary portion of the installation resting on the floor in the region of the upper edge 11 of the pool 4.

The stationary portion of the installation includes, in addition to the inspection and control station 18, an electric-power supply set 19, four sets 20 for pumping and for heating the products used for the electroplating and a control unit 21 bringing together the valves for controlling the electroplating device.

The installation also includes a winder 22 carried by the carriage 13 of the loading machine and a cable accumulator 23, the winder 22 and the accumulator 23 making it possible to move a very long assembly 24, which includes a tubular sheath or umbilical, containing supply and measurement cables and conduits, and a traction cable providing the movement of the umbilical which is connected at its end to an electroplating pipe 25.

The installation shown in FIG. 3 also includes a control station 26 resting on the floor in the upper region 11 of the pool and able to be submerged at the bottom of the vessel or of the pool.

Figure 4:
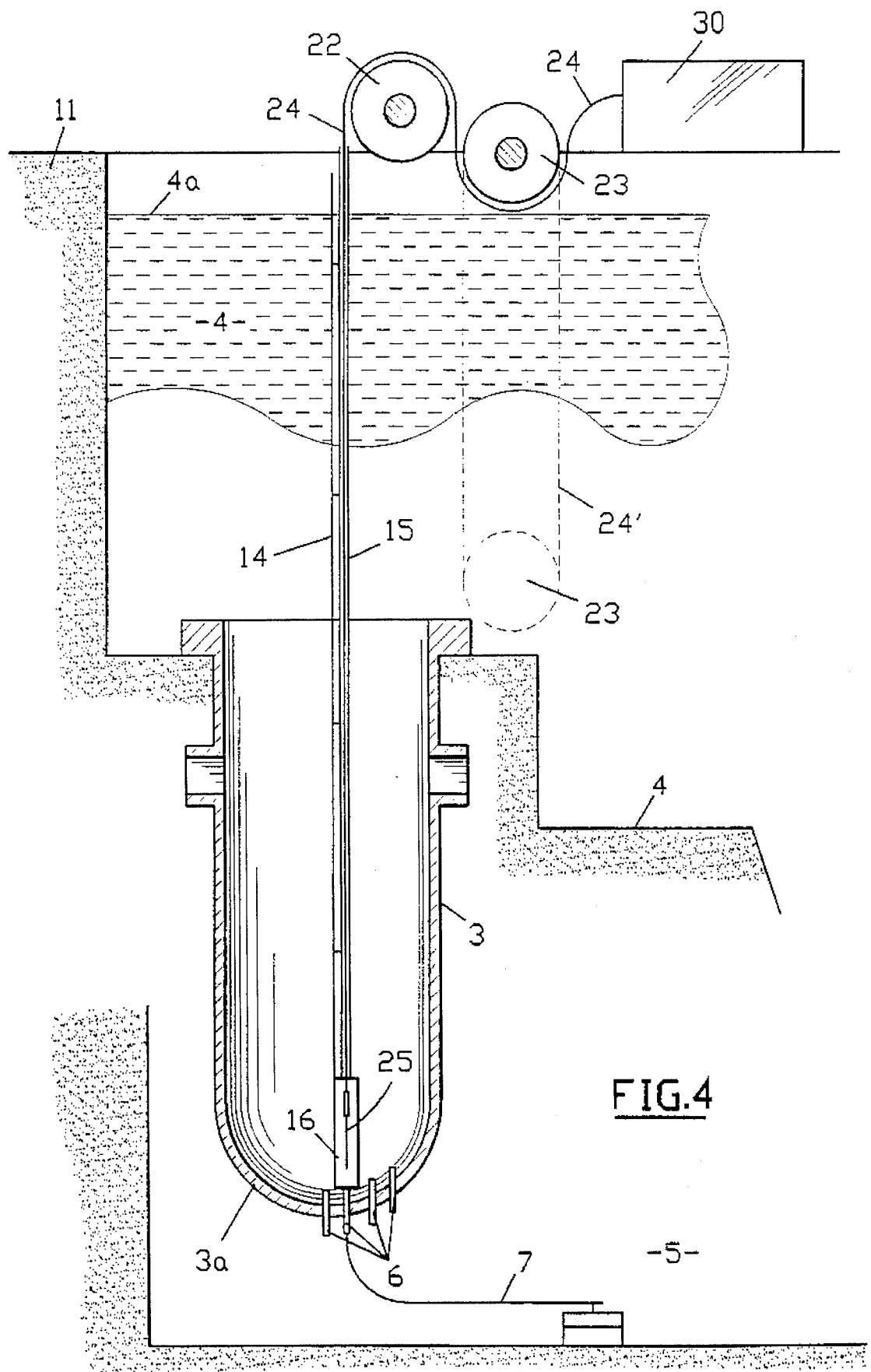
FIG. 4 is a larger-scale view of a portion of the apparatus shown in FIG. 3.

As may be seen in FIG. 4, the umbilical 24 is connected at its lower portion to an electrolysis pipe 25 and, at its opposite end, in the region of the upper edge 11 of the pool, to an electroplating module 30 bringing together the various sets and units 18, 19, 20 and 21 shown in FIG. 3.

The module 30 enables the pipe 25 to be supplied, via the umbilical 24, with electrolyte liquid, with fluid for controlling the seals and with electrolysis current.

When the pipe 25 is brought back up inside the guide tube 15, the additional length 24' of the umbilical 24 is stored by the accumulator device 23, as shown schematically in dashed lines.

Figure 5:
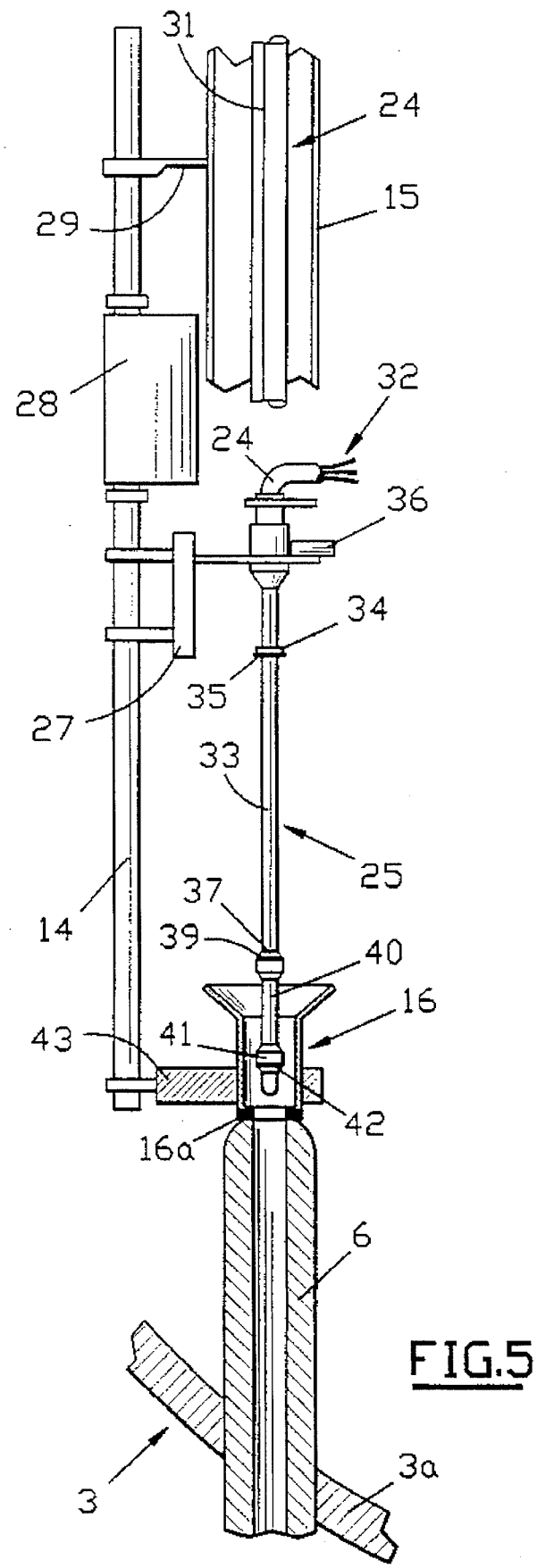
FIG. 5 is a more detailed view, in elevation and in section, of a portion of the apparatus shown in FIG. 4.

As may be seen in FIG. 5, the pole 14 carries the electrolysis pipe 25 by means of a plate 27 which is mounted so as to slide axially on the lower portion of the pole 14 and which can be moved vertically, in either direction, by an actuator 28 for raising and lowering the plate 27.

The guide conduit 15 is fixed to the pole 14, in an arrangement parallel to the latter, by support means 29 distributed along the length of the pole.

The umbilical 24 passes inside the guide conduit 15 in which it is arranged along the axial direction. A traction cable 31 is attached to the umbilical 24 so as to bring back up the umbilical inside the guide conduit 15, while the pipe is being brought back up to the upper level of the pool, for example in order to change the electrode of the pipe 25.

As may be seen in the upper portion of the pipe 25 in FIG. 5, the umbilical 24 provides the passage for an assembly 32 of supply cables and conduits, including a cable for supplying electric power to the electrode, the conduits for supplying pressurized nitrogen to the cylinders for clamping the seals of the pipe and conduits for supplying and for circulating the electrolyte liquid.

The pipe 25 tubular and includes various sections attached end to end, along the length of the pipe.

A first section 33 is formed by a flexible conduit onto which is engaged, and fixed on the outside, an adjustable stop 34 fitted with an annular seal 35 on its lower portion and which is connected at its upper portion to a locking part 36 enabling the pipe 25 to be fixed to the movable plate 27.

The upper portion of the pipe 25 is connected, above the locking part 36, to the umbilical 24, allowing the electrical connection and the coupling of the fluid conduits to the various channels passing through the pipe 25 over its entire length.

The flexible conduit 33 of the pipe 25 is connected, at its lower portion, to a coupling and sealing assembly 37 which includes a radially expandable annular seal 39. The coupling and sealing assembly 37 is itself connected to the electrode 40 of the pipe 25 in the form of a tubular metal part coupled at its lower end to a closing and sealing assembly 41 which includes a radially expandable seal 42 and is terminated by a bullet-shaped end plug.

The sealing assemblies 37 and 41 include two clamping parts between which are inserted the seals 39 and 42, respectively.

The parts for clamping the seals 39 and 42 can move axially in relation to one another and allow clamping in the axial direction and the radial expansion of the seals 39 and 42 so as to provide sealing in the bore of the vessel bottom-head penetration.

The parts for clamping the seals 39 and 42 can be controlled, in the clamping direction, by a device forming a pneumatic cylinder supplied with compressed nitrogen via conduits passing into the umbilical 24 and, in the unclamping direction, by helical springs.

The radial expansion and contraction of the seals can therefore be controlled remotely, from the upper region of the pool, by means of the control station 18 and of the control unit 21, including solenoid valves inserted in a pressurized-nitrogen circuit.

The guide and insertion end-piece 16 of the pipe 14 is fixed to the end of the pipe by means of a support 43.

The lower portion of end-piece 16 includes a substantially frustoconical engagement opening lined on the inside with a seal 16a which contacts the upper portion 6a of the vessel bottom-head penetration 6, while the electroplating pipe and an upper flared-inlet end are being installed.

The tube-shaped electrode 40 of the pipe 25 is pierced with openings for the intake and discharge of electrolyte fluid in its side wall, these openings being connected to inner annular conduits of the pipe 25 which are connected to the electrolyte circuit, including conduits passing into the umbilical 24.

The metal tubular part forming the outer portion of the electrode 40 is connected to the electric-power supply cable so as to establish an electric field and to cause an electrolysis current to flow between the electrode 40 and the inner surface of the penetration tube 6 when the pipe 25 is positioned inside the penetration tube 6, in order to perform an electroplating operation.

The tool-holder plate 27 is mounted for axial sliding movement on the lower portion of the pole 14 and can be driven in translational axial movement, in either direction, in order to insert the pipe 25 into the penetration tube 6, or respectively to withdraw the pipe 25. These movements may be obtained by using a screw arranged in the longitudinal direction of the pole, coming into engagement with a nut carried by the plate 27 and driven in rotation by the actuator for raising and lowering the plate.

Reference will now be made to FIGS. 6A to 6E in order to describe an electroplating operation inside a tube 6 for penetrating the vessel bottom head 3a.

Prior to the electroplating operation proper, the internal surface of the penetration tube 6 is brushed in the zone in which the repair and/or protection treatment is to be performed, this zone generally being near the weld 9 of the penetration tube to the vessel bottom head 3a and having an axial length of the order of 150 mm. The internal surface of the penetration tube 6 is brushed in a zone having a length of 160 mm overlapping entirely the 150 mm-long zone in which the repair or protection treatment is to be performed.

In order to carry out this brushing operation, use is made of a motorized tool which includes a cylindrical brush fixed to the shaft of a motor which can be installed either by using the pole 14, the guide conduit 15 and the end-piece 16, or an independent device which can be installed on the upper portion 6a of the penetration tube 6, by using a means for lifting and handling the loading machine or the nuclear-reactor crane.

When sufficient brushing has been carried out inside the penetration tube 6, in the zone to be treated, the brushing tool is extracted from the penetration 6 and brought back up to the upper level of the pool.

Figure 6A:
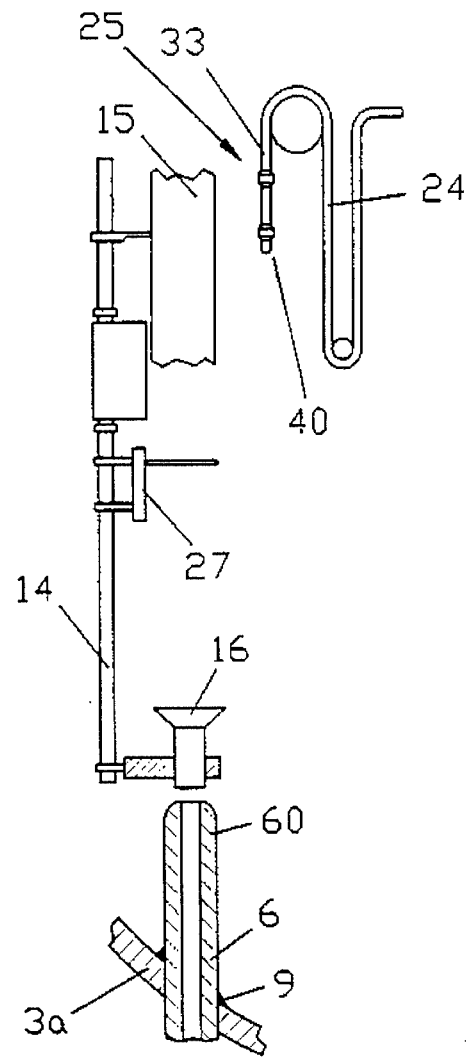
FIGS. 6A to 6E are schematic views showing the electroplating device during successive phases of a plating operation inside a vessel bottom-head penetration.

The pole 14 is then installed in the pool, as shown in FIG. 6A, so that the guide and insertion end-piece 16 lies above and vertically in line with the tube 6 for penetrating the vessel bottom head 3a.

A welding pipe 25, including the flexible conduit 33 and the electrode 40, is coupled to the end of the umbilical 24. The cables and conduits passing into the umbilical 24 are connected to the pipe 25 so as to supply the electrode with electric current and with electrolyte.

Figure 6B:
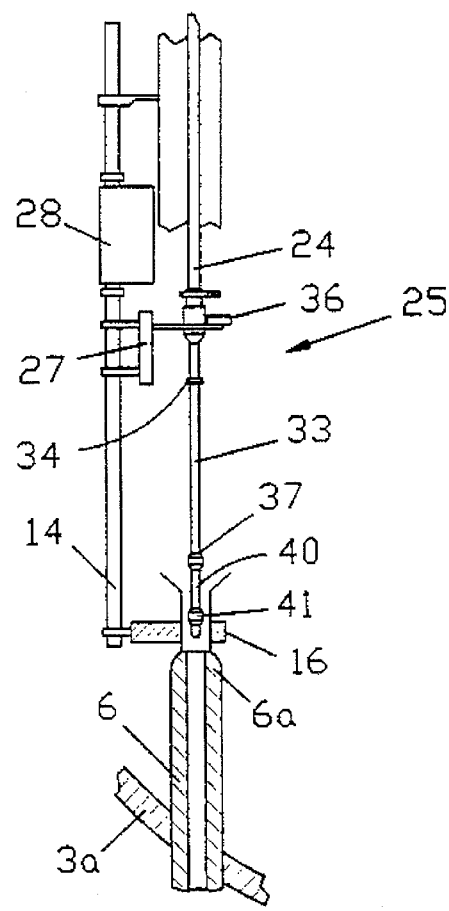

As may be seen in FIG. 6B, the end-piece 16 is next installed on the end 6a of the penetration tube 6, by lowering the rod 14 to the desired depth. The insertion and guide end-piece 16 comes into contact with the upper end 6a of the penetration tube via the seal 16a arranged inside its lower flared portion.

The position of the stop 34 is adjusted to the desired height, so as to insert the electrode 40 into the portion of the tube 6 where the treatment is to be performed.

The pipe 25 is fixed by means of the locking part 36 to the plate 27.

Figure 6C:
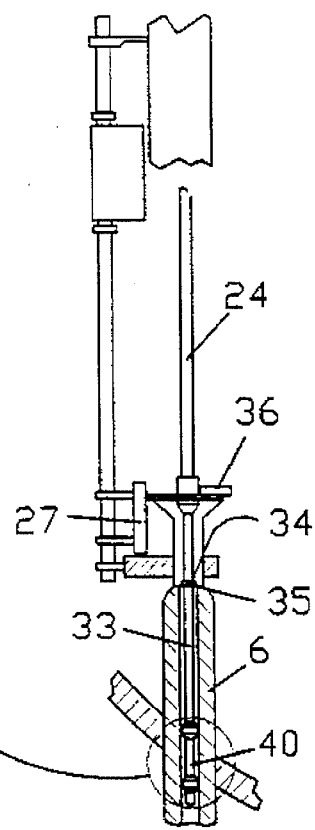

The actuator 28 of the plate 27 is operated in the direction of lowering the plate 27, which drives the pipe 25 downwards into the insertion and guide end-piece 16, including a flared upper end, and then into the bore of the penetration tube 6, as shown in FIG. 6C.

After the pipe 25 has completed the downward motion, the stop 34 rests on the upper end of the penetration tube 6 by means of its seal 35.

The insertion of the pipe 25 into the penetration tube 6 is facilitated by the fact that the pipe 25 includes a flexible portion 33 which can be adapted, in the case of an orientation defect of the penetration tube 6, in relation to the vertical direction.

The plate 27 holds the stop 34 firmly against the end of the penetration tube 6, so that the seal 35 provides a sealed closure of the annular space between the pipe 25 and the bore of the penetration tube 6. The upper portion of the conduit 33 between the locking part 36 and the stop 34 has sufficient rigidity to provide effective bearing of the seal 35.

Pressurized nitrogen is then sent into the circuit for supplying the pipe 25 with electrolyte, the pressurized nitrogen being ejected via the openings of the electrode 40 inside the penetration tube 6. The pressurized nitrogen blows out the water contained in the penetration tube 6 and in the corresponding guide tube 7 emerging into the instrumentation room 5. The water flushed out of the penetration tube 6 and of the guide tube 7 is collected in the instrumentation room and emptied into a container for collection of the liquid effluents of the power station.

Figure 6D:
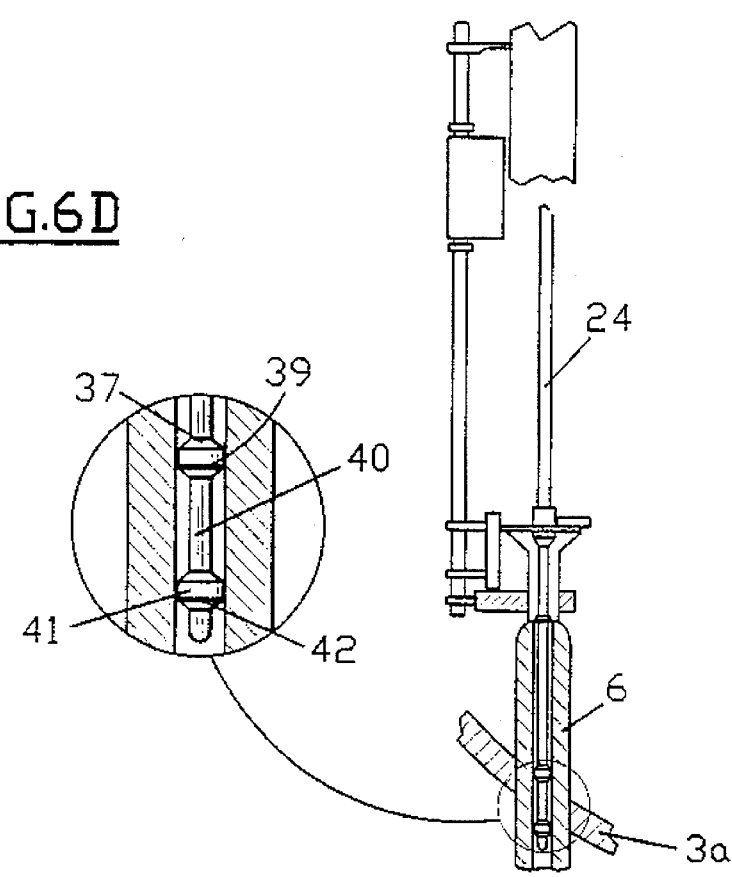

As shown in FIG. 6D, the axial clamping, resulting in a radial expansion of the seals 39 and 42, is performed by means of the corresponding clamping assemblies 37 and 41. An annular zone around the electrode 40 is thus isolated over the entire length of the zone to be treated, in the vicinity of the weld 9 of the tube 6. This zone, the position of which is adjusted perfectly by using the stop 34, has a length between the seals 39 and 42 of the order of 150 mm.

The circuit for circulating the electrolyte of the pipe 25 is then supplied with an electrolyte, the active substance of which is nickel sulphamate, in the case of the treatment of a penetration made of nickel alloy, and which is heated to a temperature of the order of 50 to 70° C. The electrode 40 is supplied with electrolysis current, so as to deposit a nickel layer onto the 10 internal surface of the penetration tube 6 between the seals 39 and 42.

The electrolysis parameters are adjusted prior to the plating operation, at the control station 26.

It is possible to operate in several steps, with a circulation of different electrolytic baths during a first step for producing a prelayer and a second step for depositing the protective nickel layer, the two steps being separated by a water rinse of the internal surface of the tube in the plating zone.

Generally, in the case of vessel bottom-head penetrations whose internal diameter is of the order of 15 mm, a protective layer of nickel of a thickness of the order of 0.1 mm is deposited onto the internal surface of the penetration.

This deposition is performed over a period of just over 20 minutes.

Next, the seals are unclamped by releasing the pressure of the nitrogen in the circuits of the seal-clamping cylinders.

The clamping parts are moved away from each other under the effect of the return springs. The seals, which are no longer compressed in the axial direction, return to their initial diameters which are less than the internal diameter of the penetration.

The device has returned to the configuration shown in FIG. 6C.

Pressurized water is then sent into the circuit for circulating the electrolyte, so that the water is ejected via the openings penetrating the electrode 40, into the bore of the penetration 6. The treated zone, the bore of the tube 6 and the guide tube 7 are thus rinsed.

The rinsing water is recovered in the instrumentation room.

The upward movement of the plate 27 is then actuated so as to bring the pipe 25 back up into the position shown in FIG. 6B.

Figure 6E:
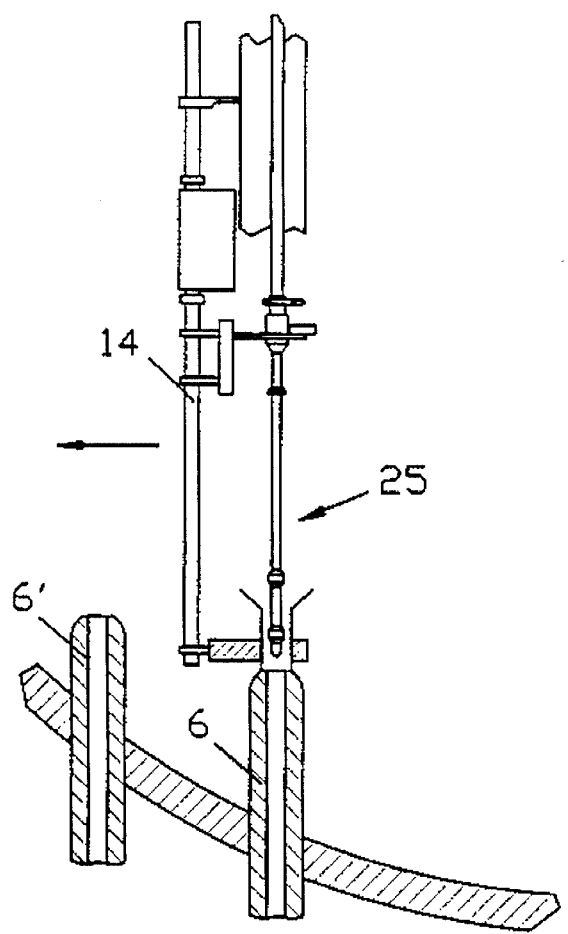

As shown in FIG. 6E, the pipe 25 carried by the pole 14 can be moved in order to arrive vertically above a penetration 6' other than the penetration 6, in which an electroplating treatment operation is to be performed.

The nickel layer deposited onto the internal surface of the penetration tube 6 has made it possible to plug up the cracks or incipient cracks possibly present in such surface, in the treated zone which is then repaired.

Furthermore, the nickel layer enables the internal surface of the penetration tube to be insulated so that, after the reactor is started up again, the internal surface of the penetration no longer comes into contact with the pressurized water for cooling the reactor, in the plated zone.

A protective nickel layer can be deposited, by way of prevention, in all the tubes for penetrating the bottom head 3a of the vessel, in the zone most susceptible to cracking, i.e., in the zone of the weld of the tubes to the vessel bottom head.

Such preventative treatment makes it possible to prevent the appearance or the development of cracks in the zones near the welds of the penetration tubes, while the reactor is operating.

The nickel layer deposited onto the internal surface of the penetration tube intended to come into contact with the pressurized water of the reactor is free of defects and stresses, so that it is virtually impervious to corrosion by the primary reactor coolant.

The process according to the invention therefore makes it possible to replace metal layer having stresses and defects created by the welding of the penetration tubes with a virgin layer, free of defects, produced by electrolysis.

Furthermore, the electrolytic nickel layer withstands well the abrasion caused by the friction of the thimble while the probe is being extracted from or being reinstalled in the core.

The process of the invention therefore makes it possible to perform a repair or an effective preventive treatment inside the tubes for penetrating a vessel bottom head of pressurized-water nuclear reactor, so as to increase the safety of the nuclear reactor and to extend its lifetime.

It is possible to deposit by electrolysis a metal other than nickel, in the case of penetration tubes which could be made of an alloy other than a nickel alloy.

In each case, a metal will be chosen which is compatible with the metal of the penetration tube and which can be deposited in the form of a homogeneous layer by an electrolysis treatment.

It is obvious that it is possible to pretreat the internal surface of the tube before the electroplating; such a pretreatment may consist of brushing, machining, descaling or electrolytic polishing or any combination of these treatments.

The invention can be implemented by using means other than those which have been described, in particular by using a pipe having a structure and, for example, means for inflating the seals other than those which have been described.

The treatment can be carried out without prior blowing of a neutral gas for flushing out the water present in the penetration tube, the seals being clamped immediately after the insertion of the pipe into the water-filled penetration tube. The water contained in the treatment space between the seals is then drained by the circuit for circulating the electrolyte.

The process and the device of the invention applies to the repair or to the protection of any penetration tube of the bottom head of the vessel of a nuclear reactor cooled by pressurized water.

What is claimed is:

1. Method for repairing and protecting from cracking the inner wall of a tube for penetrating the bottom head of a generally cylindrical vessel of a pressurized water nuclear reactor, said vessel being arranged with its axis vertical in a reactor vessel pit emerging through its upper end into a pool, said vessel comprising an upper vessel closure head and a lower convex bottom head penetrated by a plurality of substantially vertical tubes, each connected through a lower end to a reactor instrumentation room via a measurement conduit, providing the passage of a measurement probe into the reactor core which is arranged inside the vessel, said method comprising, during a period of shutdown of the nuclear reactor, the pool and the vessel inner part being filled with water, the steps of:

(a) dismounting the upper vessel closure head;

(b) removing internal equipment from said vessel;

(c) introducing into an upper end of said tube from an upper level of said pool a means for electroplating an inner surface of said tube;

(d) isolating from an inner part of said vessel filled with water and from said measurement conduit an inner zone of said tube extending along a part of an axial length of said tube through isolating means of said means for electroplating remote controlled from the upper part of said pool;

(e) filling said inner zone of said tube with an electrolyte; and so that said electric current passes through said electrolyte in order to deposit a metallic electroplating layer onto said inner surface of said tube in said inner zone.

2. Method according to claim 1, comprising circulating said electrolyte in said inner zone of said tube.

3. Method according to claim 1, wherein said metallic electroplating layer is made of nickel.

4. Method according to claim 3, wherein said electrolyte contains nickel sulfamate.

5. Method according to claim 1, wherein said metallic electroplating layer deposited on said inner surface of said tube in said inner zone has a thickness of approximately 0.1 mm.

6. Method according to claim 1, wherein said inner surface of said tube in said inner zone comprises at least one crack to be repaired by depositing said metallic electroplating layer.

7. Method according to claim 1, comprising introducing said means for electroplating successively in each tube of the plurality of substantially vertical tubes in order to deposit a metallic electroplating layer on said inner surface of each tube, by way of prevention.

8. Method according to claim 1, further comprising before the step of isolating an inner zone of said tube, blowing an inert gas into said tube so as to flush out water present in said tube.

9. Method according to claim 1, further comprising brushing said inner surface of said tube in said inner zone.

* * * * *